(12) United States Patent
Hirayama

(10) Patent No.: US 6,944,879 B2
(45) Date of Patent: Sep. 13, 2005

(54) DATA-PROVIDING SYSTEM, TRANSMISSION SERVER, DATA TERMINAL, APPARATUS, AUTHORING APPARATUS AND DATA-PROVIDING METHOD

(75) Inventor: Tomoshi Hirayama, Tokyo (JP)

(73) Assignee: Sony Corporation, Tokyo (JP)

( * ) Notice: Subject to any disclaimer, the term of this patent is extended or adjusted under 35 U.S.C. 154(b) by 1039 days.

(21) Appl. No.: 09/730,343

(22) Filed: Dec. 5, 2000

(65) Prior Publication Data

US 2001/0003832 A1 Jun. 14, 2001

(30) Foreign Application Priority Data

Dec. 14, 1999 (JP) .......................................... P11-354992

(51) Int. Cl.[7] .............................................. H04N 7/173
(52) U.S. Cl. ...................................... 725/101; 725/104
(58) Field of Search ................................. 725/101, 104

(56) References Cited

U.S. PATENT DOCUMENTS

| | | | | |
|---|---|---|---|---|
| 5,629,732 A | * | 5/1997 | Moskowitz et al. ........ | 725/102 |
| 6,295,057 B1 | * | 9/2001 | Rosin et al. ................. | 715/744 |
| 6,392,664 B1 | * | 5/2002 | White et al. ................. | 715/717 |
| 6,418,421 B1 | * | 7/2002 | Hurtado et al. ............... | 705/54 |
| 2002/0078467 A1 | * | 6/2002 | Rosin et al. .................. | 725/10 |

* cited by examiner

Primary Examiner—Krisna Lim
(74) Attorney, Agent, or Firm—Oblon, Spivak, McClelland, Maier & Neustadt, P.C.

(57) ABSTRACT

A data-providing system comprising a first data-transmitting section (control unit 1), a control section (control unit 3), and a second data-transmitting section (control unit 3). The first data-transmitting section transmits a continuous stream of content data that consists of multimedia content groups, each composed of program data and auxiliary data items. The control section processes data items obtained by dividing each program data, attribute data of the auxiliary data items and user profile data, thereby to automatically assemble new data. The second data-transmitting section changes the order in which to transmit the auxiliary data items inserted in a program, in accordance with the new data assembled by the control section.

11 Claims, 12 Drawing Sheets

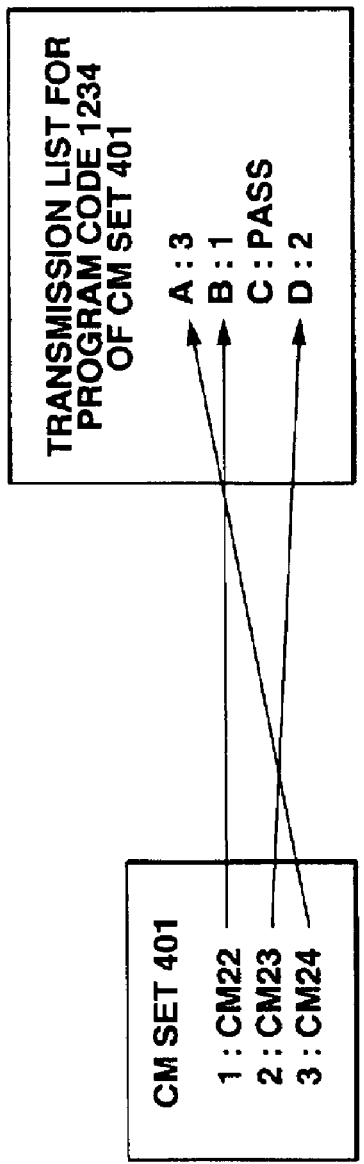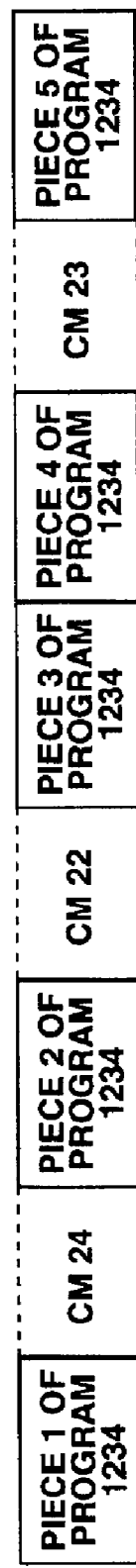

FIG.6A

CM SET 501

TRANSMISSION LIST FOR
PROGRAM CODE 1234
OF CM SET 401

| PIECE 1 OF PROGRAM 1234 | CM 25 | PIECE 2 OF PROGRAM 1234 | CM 26 | PIECE 3 OF PROGRAM 1234 | CM 27 | PIECE 4 OF PROGRAM 1234 | CM 28 | PIECE 5 OF PROGRAM 1234 |

| PIECE 1 OF PROGRAM 1234 | PIECE 2 OF PROGRAM 1234 | PIECE 3 OF PROGRAM 1234 | PIECE 4 OF PROGRAM 1234 | PIECE 5 OF PROGRAM 1234 |
|---|---|---|---|---|

FIG.7

PROGRAM CODE TO BE INSERTED
FOR CM SET 445
PROGRAM CODE 1234
PROGRAM CODE 4456
PROGRAM CODE 5377

FIG.8

DATA-PROVIDING SYSTEM, TRANSMISSION SERVER, DATA TERMINAL, APPARATUS, AUTHORING APPARATUS AND DATA-PROVIDING METHOD

BACKGROUND OF THE INVENTION

The present invention relates to a data-providing system, a transmission server, a data terminal apparatus and a data-providing method, each designed to achieve streaming transmission of multimedia contents, such as dynamic-picture data, still-picture data, audio data, computer data and the like, through Internet, a cable television network, a personal-computer communication network, a large-scale LAN or a data communication network such as radio communication network or a wire broadcasting network.

In a data communication network such as Internet, streaming transmission of data is performed, enabling users to select and obtain at their terminals any on-demand programs they want.

The on-demand programs are stored in the transmission center that transmits or broadcasts the on-demand programs. Among the programs the transmission center stores are:
1. Year-end movies and new-year movies, each containing commercials for Christmas sales
2. Year-end movies and new-year movies, each containing commercials for new-year sales
3. Year-end movies and new-year movies to be broadcast in night hours, each containing commercials for commercials Upon receipt of a demand from any user, the transmission center selects and transmits the program (e.g., a movie of any of the categories 1 to 3 described above) the user wants to enjoy. Different prices are set to the on-demand programs and costs are distributed to them.

Jpn. Pat. Appln. KOKAI Publication No. 9-18851 discloses a system in which video programs are distributed via a network, any program is selected at a terminal, and a user can select a program containing commercials or a program containing no commercials at his terminal.

In the existing on-demand broadcasting, the user can selects a plurality of programs at a time but cannot select one of the versions, if available, of the same program.

As the Internet technology advances, various contents prepared to meet the users' tastes are distributed in increasing numbers. People now wish to obtain data customized to their tastes, rather than the information presented by mass media. If data customized to the different tastes of the users is prepared, it will be an extremely amount of data. To store a large amount of data, the transmission center needs to have a large storage capacity. In addition, it takes much time and labor to edit programs to adapt them to the users' tastes that keep changing.

In the on-demand broadcasting practiced hitherto, one price is set to a combination of programs and a cost is distributed thereto. If the combination of programs is changed immediately before the programs are transmitted, it becomes difficult to determine what should be the price of the new combination and how the cost should be distributed thereto. Further, the storage capacity the transmission center must have for the library of programs grows considerably large. The transmission center needs to have an extremely large storage capacity, particularly if there is prepared a plurality of various parts that are to be inserted into programs. In this case, price-setting and cost-distribution are required for each of these program parts.

BRIEF SUMMARY OF THE INVENTION

Accordingly, the object of this invention is to provide a data-providing system, a transmission server, a data terminal apparatus, an authoring apparatus and a data-providing method, which can re-assemble data in real time in response to an instruction supplied from a terminal, said data being a combination of program data and auxiliary data items, which are to be transmitted.

Another object of the invention is to provide a data-providing system, a transmission server, a data terminal apparatus, an authoring apparatus and a data-providing method, in which different prices and different cost distributions can be allocated to contents which have been assembled in different manners.

A data-providing system according to this invention comprises a first data-transmitting section, a control section and a second data-transmitting section. The first data-transmitting section transmits a continuous stream of content data that consists of multimedia content groups, each composed of program data and auxiliary data items. The control section processes data items obtained by dividing each program data, attribute data of the auxiliary data items and user profile data, thereby to automatically assemble new data. The second data-transmitting section selects the auxiliary data items to be inserted into the program data in accordance with the new data assembled by the control section, thereby to transmit a continuous stream of content data that consists of multimedia content groups, each composed of the program data and the auxiliary data items.

Another data-providing system according to the invention comprises a first data-transmitting section, a control section and a second data-transmitting section. The first data-transmitting section transmits a continuous stream of content data that consists of multimedia content groups, each composed of pre-assembled program data and auxiliary data items. The control section processes data items obtained by dividing each program data, attribute data of the auxiliary data items and user profile data, thereby to automatically assemble new data. The second data-transmitting section selects the auxiliary data items to be inserted into the program data in accordance with the new data assembled by the control section, thereby to transmit a continuous stream of data.

A data-providing system according the invention comprises a transmission server section and a terminal section. The transmission server section performs streaming transmission of on-demand programs. The terminal section performs streaming reception of the on-demand programs transmitted from the transmission server section. The terminal section has a function of selecting a set of auxiliary data items to be inserted into a program, from sets of auxiliary data items, and a function of transmitting a signal representing the selected set of auxiliary data items, along with a terminal code of the terminal section. The transmission server section has a function of receiving the signal transmitted from the terminal section and representing the selected set of auxiliary data items, assembling the auxiliary data items in real time, and transmitting the same in accordance with a transmission list of auxiliary data items that correspond to the set of auxiliary data items inserted in a series of programs to be transmitted to the terminal section.

A data-providing system according to this invention comprises an authoring section, a transmission server section, and a terminal section. The authoring section has a function of registering, storing and transmitting program prices for user, a function of registering, storing and transmitting supplier-side equivalent conditions, a function of designating positions at which to insert auxiliary data items into a program, a function of designating auxiliary data items to be inserted into a program from auxiliary data libraries, and a function of determining an order in which to transmit the auxiliary data items prepared for a program and holding the order determined, in the form of an auxiliary data transmission list. The transmission server section transmits a continuous stream of content data that consists of multimedia content groups, each being an assembly prepared and composed of program data and auxiliary data items. The terminal section performs streaming reception of the on-demand programs transmitted from the transmission server section. The terminal section has a function of selecting a set of auxiliary data items to be inserted into a program, from sets of auxiliary data items, and a function of transmitting a signal representing the selected set of auxiliary data items, along with a terminal code of the terminal section. The transmission server section has a function of receiving the signal transmitted from the terminal section and representing the selected set of auxiliary data items, assembling the auxiliary data items in real time, and transmitting the same in accordance with a transmission list of auxiliary data items that correspond to the set of auxiliary data items inserted in a series of programs which are to be transmitted to the terminal section.

A transmission server according to the invention processes data items obtained by dividing each program data, attribute data of the auxiliary data items, and user profile data, thereby to automatically assemble data. The sever selects a group of auxiliary data items to be inserted into the program data, in accordance with the data thus assembled, and transmits a stream of the group of auxiliary data items.

A data terminal apparatus according to the present invention has a function of performing streaming reception of the on-demand programs transmitted from a transmission server, selecting a set of auxiliary data items to be inserted into a program, from sets of auxiliary data items, and transmitting a signal representing the selected set of auxiliary data items, along with a terminal code of the terminal section.

An authoring apparatus according to the invention has a function of registering, storing and transmitting program prices for user, a function of registering, storing and transmitting supplier-side equivalent conditions, a function of designating positions at which to insert auxiliary data items into a program, a function of designating auxiliary data items to be inserted into a program from auxiliary data libraries, and a function of determining an order in which to transmit the auxiliary data items prepared for a program and holding the order determined, in the form of an auxiliary data transmission list.

A data-providing method according to the invention comprises the steps of: processing data items obtained by dividing each program data, attribute data of the auxiliary data items, and user profile data, thereby to automatically assemble data; selecting a group of auxiliary data items to be inserted into the program data in accordance with the data thus assembled; and transmitting a continuous stream of content data that consists of multimedia content groups, each composed of program data and auxiliary data items.

A data-providing method according to this invention comprises the steps of: transmitting a continuous stream of content data that consists of multimedia content groups, each composed of program data and auxiliary data items; processing data items obtained by dividing each program data, attribute data of the auxiliary data items and user profile data, thereby to automatically assemble new data; and selecting the auxiliary data items to be inserted into the program data in accordance with the new data assembled by the control section, thereby to transmit a continuous stream of data.

A data-providing method according to the present invention comprises the steps of: selecting a set of auxiliary data items to be inserted into a program, from sets of auxiliary data items, at a terminal that receives a stream of on-demand programs from a transmission server; transmitting from the terminal a signal representing the selected set of auxiliary data items, along with a terminal code of the terminal section; receiving, at the transmission server, the signal transmitted from the terminal and representing the selected set of auxiliary data items; assembling, in the transmission sever, the auxiliary data items in real time in accordance with a transmission list of auxiliary data items that correspond to the set of auxiliary data items inserted in a series of programs to be transmitted to the terminal; and transmitting the auxiliary data items from the transmission server.

As described above, the present invention utilizes the characteristics of on-demand broadcasting, enabling users to insert or not some of auxiliary data items into packaged program data, without necessity of producing a plurality of programs. This saves the time for editing programs. Since data items are assembled in real time and transmitted, the transmission server need not have a large storage capacity. Further, the prices and credit points of programs and auxiliary data items are prescribed as "program prices for user" and "advantages and disadvantages of auxiliary data items." This makes it possible to calculate immediately the prices at which the users may buy the contents. The users can know the prices thus calculated and can apply the prices directly to a charge-settling system. Moreover, the equivalents the user needs to pay for the programs and auxiliary data items are determined from "program equivalent conditions for users" and "auxiliary data equivalent conditions for users." Therefore, the equivalents that should be paid among the suppliers and players for using the contents can be calculated at the site and directly applied to the charge-settling system.

BRIEF DESCRIPTION OF THE SEVERAL VIEWS OF THE DRAWING

FIGS. 5A, 5B and 5C are diagrams illustrating a method of preparing a CM set and a CM-transmission list;

FIGS. 6A, 6B and 6C are diagrams showing another method of preparing a CM set and a CM-transmission list;

FIG. 7 is a diagram depicting the data to transmit, in which no CM sets are inserted;

FIG. 8 is a diagram showing the codes of programs into which CM sets are to be inserted in the data-providing system;

DETAILED DESCRIPTION OF THE INVENTION

An embodiment of the present invention will be described, with reference to the accompanying drawings.

Figure 1:
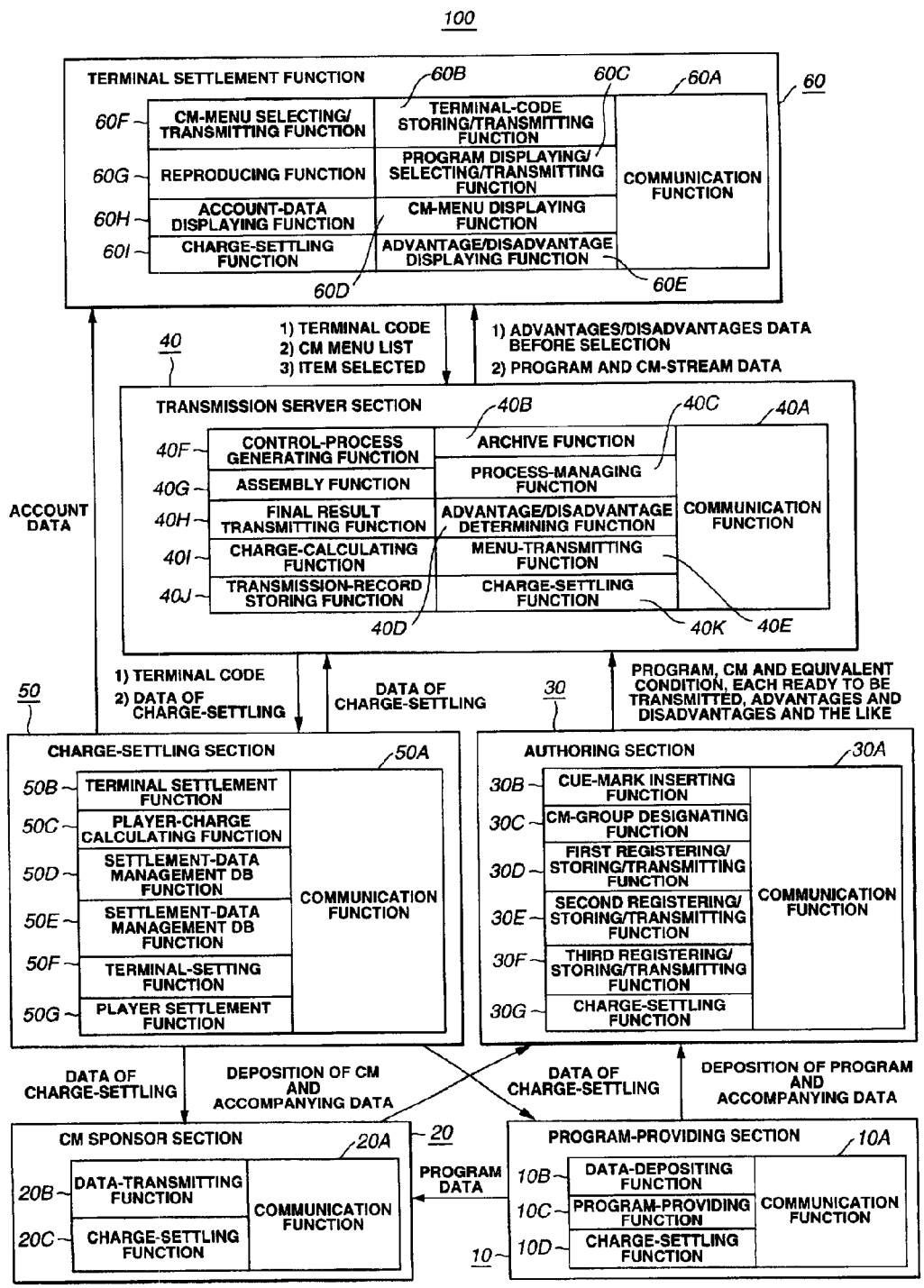
FIG. 1 is a block diagram showing the various sections of a data-providing system according to the present invention.

The present invention is applied to, for example, a data-providing system 100 shown in FIG. 1. The data-providing system 100 comprises a program-providing section 10, a CM sponsor section 20, an authoring section 30, a transmission server section 40, a charge-settling section 50, and a terminal section 60.

The program-providing section 10 incorporated in the system 100 has a communication function 10A of receiving data from, and transmitting data to, the CM sponsor section 20, authoring section 30 and charge-settling section 50. The program-providing section 10 has a data-depositing function 10B that transmits programs and accompanying data to the authoring section 30. The accompanying data includes program prices for users, BY(backyard)-side program equivalent conditions, possible cue positions designated. Further, the program-providing section 10 has a program-providing function 10C that supplies program data to the CM sponsor section 20. Moreover, the program-providing section 10 has a charge-settling function 10D, which settles charges in accordance with the periodical statement sent from the charge-settling section 50 and concerning each player, i.e., a CM sponsor.

The CM sponsor section 20 provided in the data-providing system 100 has a communication function 20A, which receives data from, and transmits data to, the program-providing section 10, authoring section 30 and charge-settling section 50. The CM sponsor section 20 has a data-transmitting function 20B that transmits accompanying data to the authoring section 30. The accompanying data includes CM clips and BY-side CM equivalent conditions. Further, the CM sponsor section 20 has a charge-settling function 20C, which settles charges in accordance with the periodical statement sent from the charge-settling section 50 and concerning each player, i.e., a CM sponsor.

The authoring section 30 provided in the data-providing system 100 has a communication function 30A. The function 30A receives data from, and transmits data to, the program-providing section 10, CM sponsor section 20, transmission server section 40 and charge-settling section 50. The authoring section 30 also has a cue-mark inserting function 30B that inserts cue marks, each designating a position in a program, where a CM should be inserted in a program. The data of the program and the cue mark may constitute a pair of data items that have the common program code and time code. Alternatively, the cue mark may be inserted into the data of the program, in the form of a special signal. Consequently, the authoring section 30 has a registering/storing/transmitting function for the program data containing a cue mark-group or a cue mark. Further, the authoring section 30 has a CM-group designating function 30C that designates at least one of CM groups included in a CM library, which should be inserted into a specified program, in accordance with the advice made by the CM sponsor section 20. The CM-group designating function 30C also allocates programs codes designating the programs into which CM groups should be inserted, in accordance with the advice made by the CM sponsor section 20. The CM groups designated by the CM-group designating function 30C will be called "CM sets" hereinafter. The authoring section 30 has a first registering/storing/transmitting function 30D. This function 30D registers, stores and transmits the program prices for users, i.e., the prices the users should pay for the programs transmitted (or not transmitted) to them. The first registering/storing/transmitting function 30D also registers, stores and transmits the BY-side program equivalent conditions, i.e., the conditions in which the suppliers (players such as CM sponsors, transmission server owners, authoring function owners, charge-settling function owners, program providers and the like) transmit (or do not transmit) programs. The authoring section 30 has a second registering/storing/transmitting function 30E, which determines the order in which the CM sets prepared for a certain program should be transmitted, in accordance with the advice made by the CM sponsor section 20. The function 30E stores the order thus determined, as a CM-transmission list. The function 30E registers, stores and transmits the CM advantages and disadvantages that the users may have when CMs designated in the CM-transmission list are transmitted (or not transmitted). The authoring section 30 further has a third registering/storing/transmitting function 30F. This function 30F registers, stores and transmits the BY-side CM equivalent conditions specifying the equivalents which should be paid among the suppliers (players such as CM sponsors, transmission server owners, authoring function owners, charge-settling function owners, program providers and the like) when the CMs included in the CM-transmission list are transmitted (or not transmitted). The authoring section has a charge-settling function 30G, too. The charge-settling function 30G settles charges in accordance with the periodical statement sent from the charge-settling section 50 and concerning each player, i.e., each authoring function.

The authoring section 30 having various functions 30A to 30G can insert cue marks, each being a signal indicating where in a program a CM can be inserted. A cue mark is nothing more than a trigger. Which CM should be inserted in the program is determined from the CM-transmission list and the CM set. CM groups to be inserted later can therefore be easily interchanged. CM numbers may be allocated to the positions of cue marks, thereby to hold signals, each of which neglects or adopts a cue mark. The authoring section 30 can designate (upon receipt of an advice from a CM sponsor) a plurality of CM groups that should be inserted into a specific program from many CM libraries. The authoring section 30 can determine (upon receipt of an advice from a CM sponsor) the order in which the CM sets prepared for a program should be transmitted. The authoring section 30 can hold the data showing this order, in the form of a plurality of CM-transmission lists. Further, the authoring section 30 can register, store and transmit the CM advantages of disadvantages that the user may have when the series of CMs designated in the CM-transmission lists are transmitted (or not transmitted). Moreover, the authoring section 30 can register, store and transmit the BY-side CM equivalent conditions specifying the equivalents which should be paid among the suppliers (players such as CM sponsors, transmission server owners, authoring function owners, charge-settling function owners, program providers and the like) when the CMs included in the CM-transmission lists are transmitted (or not transmitted).

The transmission server section 40 incorporated in the data-providing system 100 has a communication function 40A that receives data from, and transmits data to, the authoring section 30, charge-settling section 50 and terminal section 60. The transmission server section 40 has an archive function 40B that achieves program data containing cue marks, CM data, CM sets, program codes to be inserted, CM-transmission lists, transmission conditions and the like. The section 40 has a process-managing function 40C that receives terminal codes transmitted from the terminal section 60, selects terminals and manages the processes in the terminals. The transmission server section 40 has an advantage/disadvantage determining function 40D. The function 40D determines advantages and disadvantages from the program prices for users and the CM advantages and disadvantages. The advantages and disadvantages determined are transmitted to the terminals. The section 40 further has a menu-transmitting function 40E that transmits the data showing a program-selecting menu and a CM menu. The section 40 has a control-process generating function 40F, too, which generates a control process of receiving a CM menu and inserting or not inserting a terminal code. The transmission server section 40 further has an assembly function 40G that effects real-time assembling of any program selected and CMs to be inserted into the program, generating a program-CM assembly. The program-CM assembly is transmitted to the terminals. The section 40 has a final result transmitting function 40H that transmits the data representing the advantages and disadvantages of the program and CMs, which have been determined, to the charge-settling section 50. The section 40 has a charge-calculating function 40I, too, that calculates the equivalents to be transferred among the players, from the BY-side program equivalent conditions and the BY-side CM equivalent conditions for the CMs of each CM set. The equivalents thus calculated are transmitted to the charge-settling section 50. The transmission server section 40 has a transmission-record storing function 40J that stores the transmission record of CMs. The section 40 has a charge-settling function 40K that settles charges in accordance with the periodical statement sent from the charge-settling section 50 and concerning each player, i.e., each transmission server function.

The transmission server section 40 having various functions 40A to 40K can determine the advantages and disadvantages the user may have when he receives a program containing CMs or does not receive the same, from the user price of the program and the CM advantages and disadvantages of the CM sets that may be inserted into the program. The section 40 can transmit the advantages and disadvantages, thus determined, to the user designated by a terminal code, as a response to a CM menu request. Further, the section 40 can receive from a terminal a signal representing the CM set that has been selected to be inserted into a program. The section 40 can assemble auxiliary data items in real time and transmit the same in accordance with the procedure of transmitting the auxiliary data items in the form of an auxiliary-data set inserted in the programs to be transmitted to the terminal. Moreover, the section 40 can transmits the program a customer using the terminal designated by a terminal code has selected, and also the advantages and disadvantages determined from the CM set inserted in the program, to the charge-settling section 50 (serving as a subscriber management system). The section 40 can transmit the advantages and disadvantages to the terminal, too. Further, the transmission server section 40 can supply charge-settling data to the DB (Database) of each player (CM sponsor, transmission server owner, authoring function owner, charge-settling function owner, program provider or the like), so that the charge-settling data may be managed in the DB. The charge-setting data shows the payments made among the suppliers (i.e., players) and calculated from the BY-side program equivalent conditions and the BY-side CM equivalent conditions for the CMs shown in the CM-transmission list inserted in the program.

The charge-settling section 50 provided in the in the data-providing system 100 has a communication function 50A. The function 50A receives data from, and transmits data to, the program-providing section 10, CM sponsor section 20, authoring section 30, transmission server section 40 and terminal section 60. The section 50 has a terminal settlement function 50B, which receives the output of the final result transmitting function 40H provided in the transmission server section 40 and settles charges for each terminal by using the data base DB. The section 50 has a player-charge calculating function 50C, which receives the charge-settling data generated by the charge-calculating function 40I of the transmission server section 40 and represents the equivalents to be settled among the players. The player-charge calculating function 50C performs charge-settling for each player by using the DB. The charge-settling section 50 also has two settlement-data management DB functions 50D and 50E. The function 50D manages settlement data for each terminal. The function 50E manages settlement data for each player. Further, the section 50 has a terminal-settlement function 50F, which achieves charge-settling for each terminal, and prepares and transmits a periodical statement for each terminal. Still further, the section 50 has a player settlement function 50G, which achieves charge-settling for each player, and prepares and transmits a periodical statement for each terminal.

The charge-settling section 50 having various functions 50A to 50G can periodically tabulate the user's advantages and disadvantages stored in the DB and managed by each terminal and can transmit a statement to the user, so that the user may accomplish charge-settlement. The section 50 can also periodically tabulate the equivalents calculated to be paid among suppliers (i.e., players such as CM sponsor, transmission server owner, authoring function owner, charge-settling function owner, program provider and the like), and can transmit a statement to each player so that the player may accomplish charge-settlement.

The terminal section 60 of the data-providing system 100 is a terminal that can receive a stream of on-demand programs via the Internet or a similar network. The section 60A has buttons that are operated to select CMs to be inserted into a program. The buttons may be provided on the remote controller for the section 60. The terminal section 60 has a communication function 60A for receiving data from, and transmitting data to, the transmission server section 40 and charge-settling section 50. The section has a terminal-code storing/transmitting function 60B, too, which reads terminal codes from the terminals and transmits the terminal codes to the transmission server section 40. The section 60 has a program displaying/selecting/transmitting function 60C, which receives and displays a program menu, selects programs from the menu, and transmits the result of program selection. Further, the terminal section 60 has a CM-menu displaying function 60D, which requests the transmission server section 40 for a CM menu (showing advantages and disadvantages, too), receives a CM menu from the transmission server section 40 and displays the CM menu it has received. The section 60 has an advantage/disadvantage displaying function 60E, too, which displays advantages and disadvantages. The section 60 has a CM-menu selecting/transmitting function 60F, which selects a CM menu and transmits the same. The section 60 has a reproducing function 60G that reproduces the content data the section 60 received. Further, the section 60 has an account-data displaying function 60H, which requests the charge-settling section 50 for account data, receives the account data and display the same. The terminal section 60 has a charge-settling function 60I, which receives a periodical statement from the charge-settling section 50 and performs charge-settling based on the statement.

The terminal section 60 having various functions 60A to 60I can select a program that the user may enjoy and transmit a CM menu request signal, together with a terminal code, in order to receive the advantages and disadvantages the user may have when the program is combined with CMs and when the program is not combined with CMs. The terminal section 60 can inform the user of the advantages and disadvantages determined from the combination of the program and the CMs, before the user selects the program. Moreover, the terminal section 60 can transmit two signals, along with its own terminal code, to the transmission server section 40. The first signal indicates that the section 60 has received a CM group selected. The second signal indicates that a CM set selected to be inserted in the program. If the second signal is a null signal, it means that the terminal section 60 has received no CMs.

Needless to say, the CMs transferred within the data-providing system 100 include ordinary advertisement data items. The CMs may include other data items, for example, the answers to the questions asked in a quiz show, special offers made to selected customers, or the items of a questionnaire, to which "YES" or "NO" should be input. The data items auxiliary to the data of program are collectively be called "CMs" here.

The price of a program containing no CMs is not necessarily be higher than the price of a program containing no CMs. It is important to put prices to programs in accordance with the nature of CMs, if any, inserted in a program. For instance, a program containing the answers to the questions made in a quiz show is more expensive than a program not containing the answers. If a program contains a questionnaire and if the user answers the questions, the user may be paid.

In the data-providing system 100, each program has content data, i.e., the program data, and accompanying data items A1 to A4 described below:

A1: Program Price for User

The program price for user is one the user should pay for the program he receives during a prescribed period. It is determined from, for example, the following conditions:

Basic charge=1000 yen, which the user must pay to the charge-settling section 50

CM-insertion charge=100 yen for each CM, to be paid to the charge-settling section 50

Charge for inserting CM 456=400 pints, which the user receives from the advertiser 456

It is not stipulated that charge-settling be made every time a transaction is performed. Rather, the data concerning charge-settling is collected at the charge-settling section 50, which settle all charges.

A2: BY-side Program Equivalent Conditions

The BY-side program equivalent conditions are applied to determine which function must pay charges to which function, for any program transmitted during the prescribed period. These conditions are as follows:

The charge-settling section 50 must pay a basic charge of 300 yen to the program-providing section 10.

The charge-settling section 50 must pay 10 yen to the transmission server section 40 and 10 yen to the authoring section 30, when a CM is inserted into the program.

Figure 2:
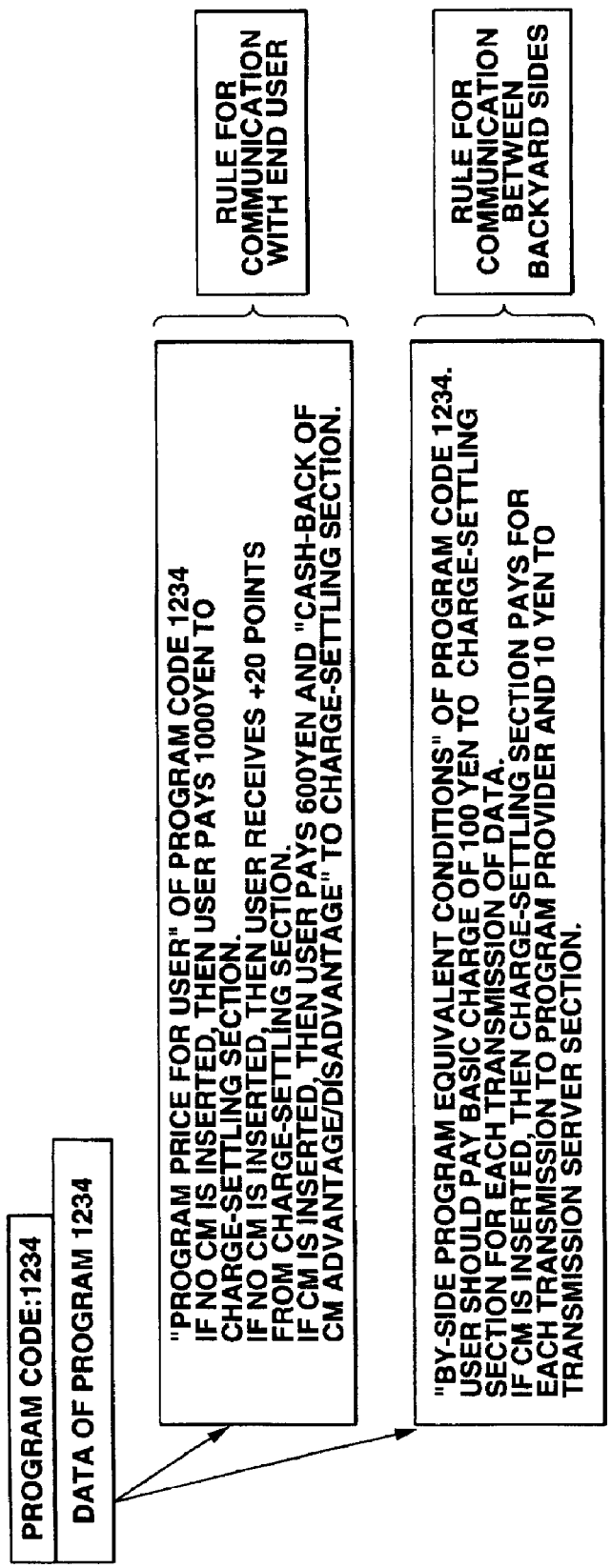
FIG. 2 is a diagram illustrating the relation between each program, on the one hand, and the price thereof and the BY-side program equivalent conditions.

FIG. 2 shows the relation that the program price for user has with the BY-side program equivalent conditions.

A3: Program Code

The program code is the code given to each program for specifying the program.

A4: Cue Mark

A cue mark is a special signal contained in the time-code data or program, indicating the position at which a CM should be inserted in the program.

In the transmission server section 40, the assembly function 40G performs real-time assembling of CMs, referring to the cue mark. When the cue mark is found, the section 40 stops transmitting the program. Then, the section 40 transmits the CMs in the CM set shown in the CM-transmission list, in the order described in the CM-transmission list. Immediately after the CMs terminate, the section 40 starts transmitting the program again. As long as cue marks follow one after another, the section 40 continuously transmits CMs in the prescribed order, without transmitting the program again.

Figure 3:
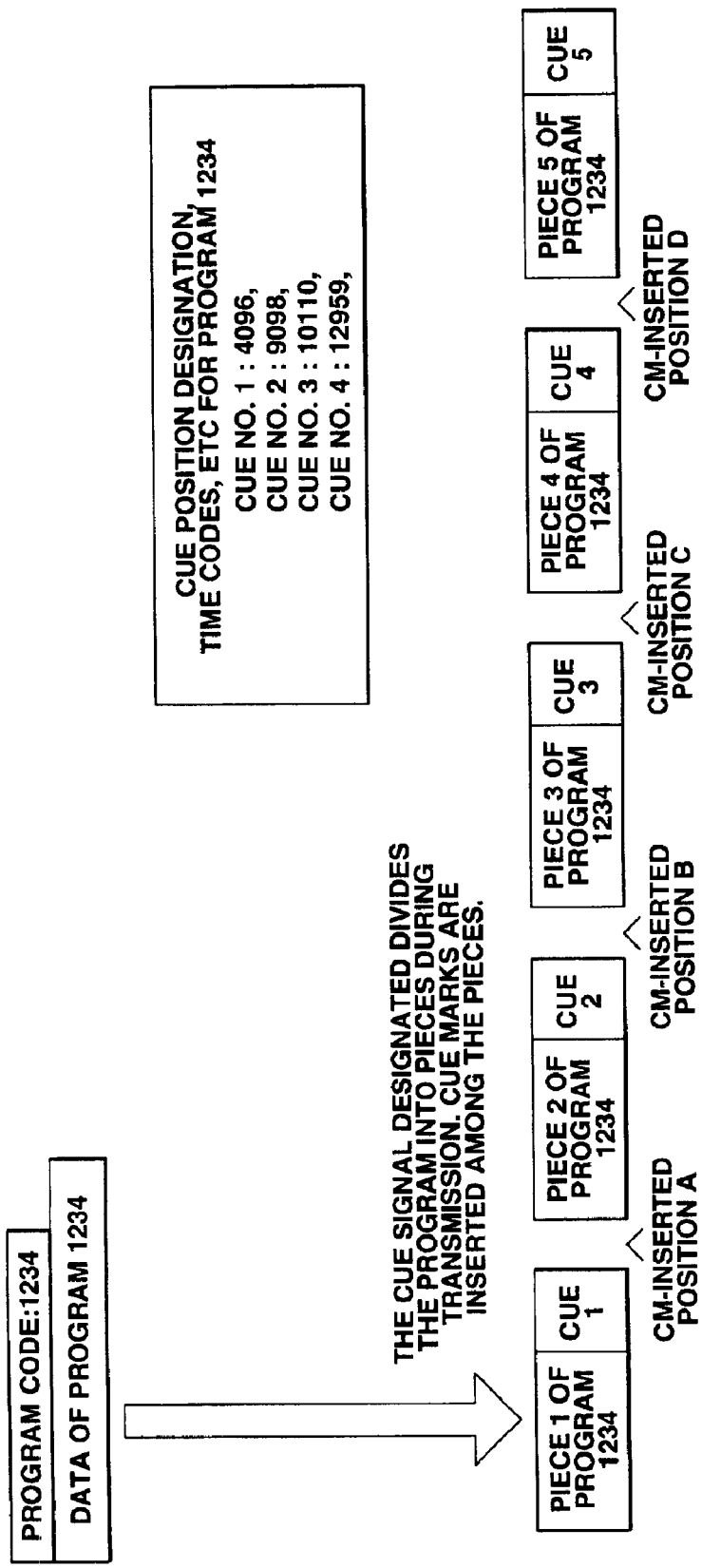
FIG. 3 is a schematic representation of program cues and CM-inserting process.

Time codes (4096, 9098, 10110 and 12959) may designate the cue positions for the data of program 1234 identified by program code 1234, as is shown in FIG. 3 or as set forth below:

Cue No. 1: 4096
Cue No. 2: 9098
Cue No. 3: 10110
Cue No. 4: 12959.

In this case, the data of program 1234 is divided into pieces 1 to 5, and cue marks are interposed among these data pieces 1 to 5. The cue marks indicate the positions A to D at which CMs will be inserted in the program.

Figure 4:
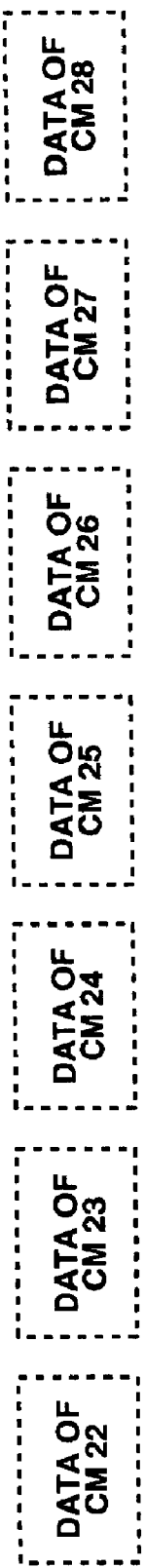
FIG. 4 is a diagram depicting the CM library incorporated in the data-providing system.

Assume that a CM library has been prepared, which is composed of CMs 22 to 28 as illustrated in FIG. 4, and that a CM set 401 to be inserted into program code 1234 is composed of CM 22, CM 23 and CM 24 as shown at A in FIG. 5. Then, a CM-transmission list shown at B in FIG. 5 is prepared. In accordance with the CM-transmission list, CM 24, CM 22 and CM 23 are inserted in the program 1234, respectively at the CM-inserting positions A, B and D, as is illustrated at C in FIG. 5. CMs 22, 23 and 24 can thereby be transmitted.

Assume that a CM set 501 to be inserted into program code 1234 is composed of CM 25, CM 26, CM27 and CM 28 as shown at A in FIG. 6. Then, a CM-transmission list shown at B in FIG. 6 is prepared. In accordance with this CM-transmission list, CM 25, CM 26, CM 27 and CM 28 are inserted in the program 1234, respectively at the CM-inserting positions A, B, C and D, as is illustrated at C in FIG. 6. CMs 25 to 28 can thereby be transmitted.

A CM set to be inserted into a program may be null. In this case, the data of the program 1234 (i.e., pieces 1 to 5) can be transmitted in the order shown in FIG. 7.

To use the CM set 401 for not only the program 1234, but also the programs 4456 and 5377, the programs in which CM sets are to be inserted have such codes as are illustrated in FIG. 8. It is natural that different CM-transmission lists be prepared, each for one program.

In the data-providing system 100, each CM is composed of CM content data and accompanying data (B1), which will be described later.

In the system 100, each cue marks is no more than a CM-inserting trigger. Which CM should be inserted at which position in a program is determined from the CM set and the CM-transmission list. The CM group to be inserted in the program can be easily replaced by another CM group. Alternatively, the ID numbers of CMs may be allocated to the cue mark positions, and signals may be stored, each signal neglecting or adopting one cue mark. This simplifies the process of transmitting CMs, somewhat.

B1: BY-side CM Equivalent Conditions

The BY-side CM equivalent conditions are applied to determine which supplier pays which supplier for the CMs transmitted during the prescribed period.

These conditions are as follows:

When the CM set including the CM in question is transmitted, the CM sponsor section 20 pays 10 yen to the authoring section 30 only once, no matter how many CMs the CM sponsor section 20 has transmitted. However, the CM sponsor section 20 must pay 20 yen to the charge-settling section 50 every time it transmits a CM.

In the data-providing system 100, a CM set is composed of data C1 that is defined as follows:

C1: Name of a CM set and the CM group contained in the CM set (methods of designating means for accessing entities).

In the data-providing system 100, a CM-transmission list is composed of the following data items D1 to D3. Two or more pairs are provided, each pair consists of one or more CM sets and a CM-transmission list. A pair consisting of one CM set and a CM-transmission list will be described.

D1: Name of the CM set

D2: Order in which to transmit the CM groups included in the CM set (the CM groups may be transmitted repeatedly)

To broadcast the same CM repeatedly in a program, the data identifying the CM appears several times in the CM-transmission list.

D3: CM advantages/disadvantages

The CM advantages/disadvantages are conditions applied when the user receives a CM group during the prescribed period. The conditions are as follows:

When a CM set is selected, the incentive points of the CM sponsors are added, and +300 points are added to the account of the terminal (user) controlled by a charge-settling system. The cash-back of the CM advantages and disadvantages is −200 yen. In the data-providing system 100, each CM set is paired with a group of program codes, each designating one program to be inserted in the CM, in order to insert the CM set into various programs.

The CM set, <CM 34, CM 56, CM 22>, may be used for program 23, program 134 and program 344. If so, the program code group is <23, 134, 344>.

CM sets of the same program code group are not always described in the same CM-transmission list. This is because CM sets may be transmitted in an order different from the order they are arranged in the program code group.

The advantages and disadvantages determined in the data-providing system 100 are those, which the user may have when he receives a program or a combination of program and CMs. They are determined from the program prices for users and the CM advantages and disadvantages.

Figure 9:
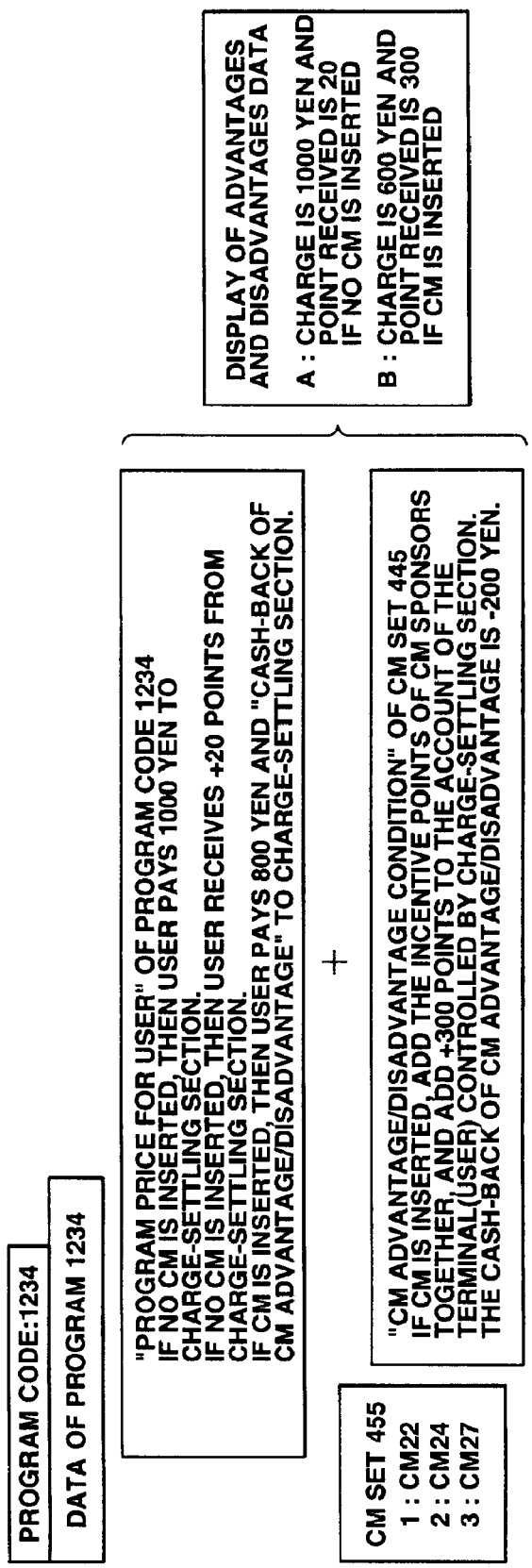
FIG. 9 is a diagram explaining how to determine the advantages and disadvantages the user may have when he uses the data-providing system.

Assume that a CM set 445 is inserted in the program 1234 as shown in FIG. 9. The program 1234 has the prices for users (A1), and the CM set 445 has the CM advantages/disadvantages (D3). The advantages and disadvantages the user has when he receives the combination of the program 1234 and the CM set 445 are calculated as follows:

(1) If no CMs are received (if no CMs are inserted in the program), the user pays 1000 yen and receives 20 points.

(2) If CMs are received (if any CM set is inserted in the program), the user pay 600 yen (800−200), and receives 300 points.

Figure 10:
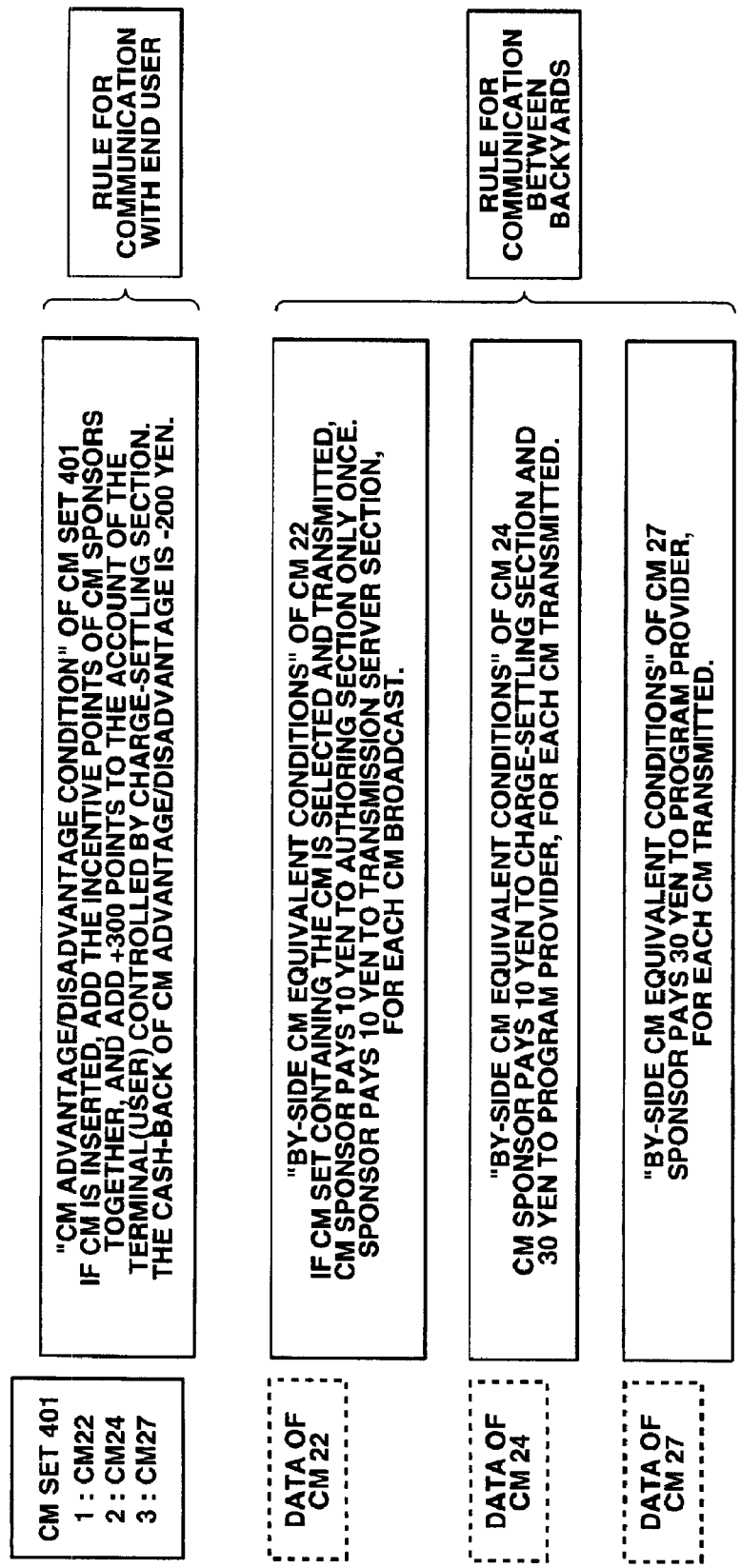
FIG. 10 is a diagram illustrating the relation between the advantages and disadvantages of each CM set and the BY-side CM equivalent condition of the CM set, observed in the data-providing system.

FIG. 10 illustrates the relation the CM advantage/disadvantage of each CM set has with the BY-side CM equivalent conditions of the CM set.

The costs of a supplier are calculated in the data-providing system 100, as will be described below.

In the system 100, the transmission server section 30 determines: (i) which program has been transmitted; (ii) which CM has been transmitted and how many times; (iii) in what condition the program has been transmitted: and (iv) in what condition the CM has been transmitted.

On the basis of the facts there are determined the BY-side program equivalent conditions of the program and the BY-side CM equivalent conditions of the CM. From these conditions it is determined how equivalents should be paid.

For example, the charge is settled as follows when a program having the BY-side program equivalent conditions (A2) is transmitted, together with a CM having the BY-side CM equivalent conditions (B1).

The charge-settling section 50 pays 100 yen to the program-providing section 10.

The charge-settling section 50 pays 10 yen to the program-providing section 10.

The charge-settling section 50 pays 10 yen to the transmission server section 40.

The CM sponsor section 20 pays 10 yen to the authoring section 30.

The CM sponsor section 20 pays 20 yen to the charge-settling section 50.

What the user needs to pay has not been specified. If a program having the BY-side program equivalent conditions (A2) is transmitted alone, the charge-settling is carried out as will be described below.

The charge-settling section 50 pays 100 yen to the program-providing section 10.

Figure 11:
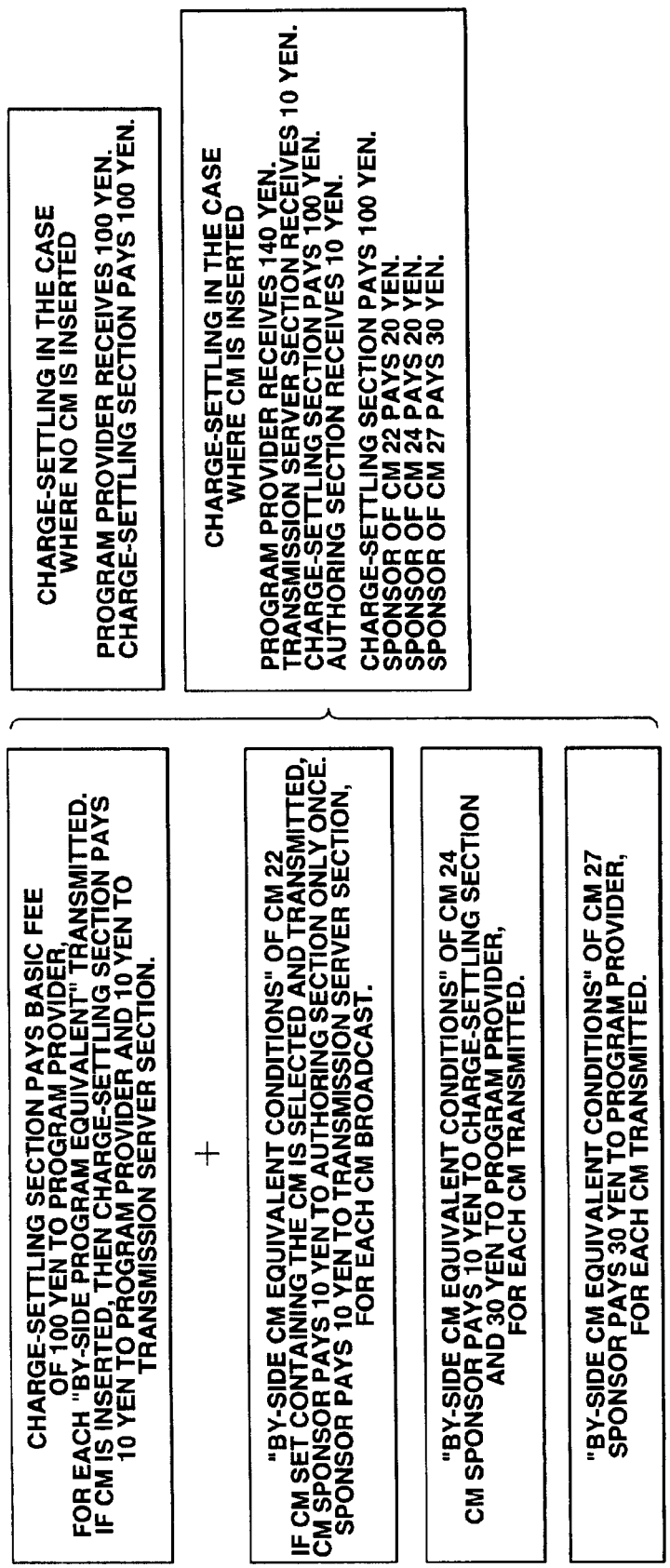
FIG. 11 is a diagram showing a method of calculating the data supplier's cost from the BY-side program equivalent conditions and the BY-side CM equivalent conditions, in the data-providing system.

What the user needs to pay has not been specified. FIG. 11 explains how the data supplier's costs are calculated from the BY-side program equivalent conditions of the program 1234 and the BY-side CM equivalent conditions of the CM 22, CM 24 and CM 27.

In the data-providing system 100, a CM menu is used to select a CM or CMs to be inserted into a program after the user has selected the program from the program menu. The user can select any CM from the many shown in the CM menu. The CM menu is displayed, in most cases along with the advantages and disadvantages the user may have when he selects a CM or CMs.

In the data-processing system 100, a control process is effected when a program is selected and a program-transmitting mode is selected from the four alternative modes. The four program-transmitting modes are: (1) transmitting the program along with CM set 4011; (2) transmitting the program together with CM set 501; and (3) to transmitting the program along with no CMs.

In the program-transmitting mode (1), the CM set 401 is inserted in the program. Therefore, the control process is carried as follows. First, the pointer in the CM-transmission list for the CM set 401 is advanced every time a cue is detected in the program, thereby detecting the number of each CM. Then, the presence of a CM is detected from the data of the CM set 401, which is paired with the program. The name of any CM transmitted is described in a transmission record (for future inspection). These steps of the control process are repeated until the program terminates.

Figure 12:
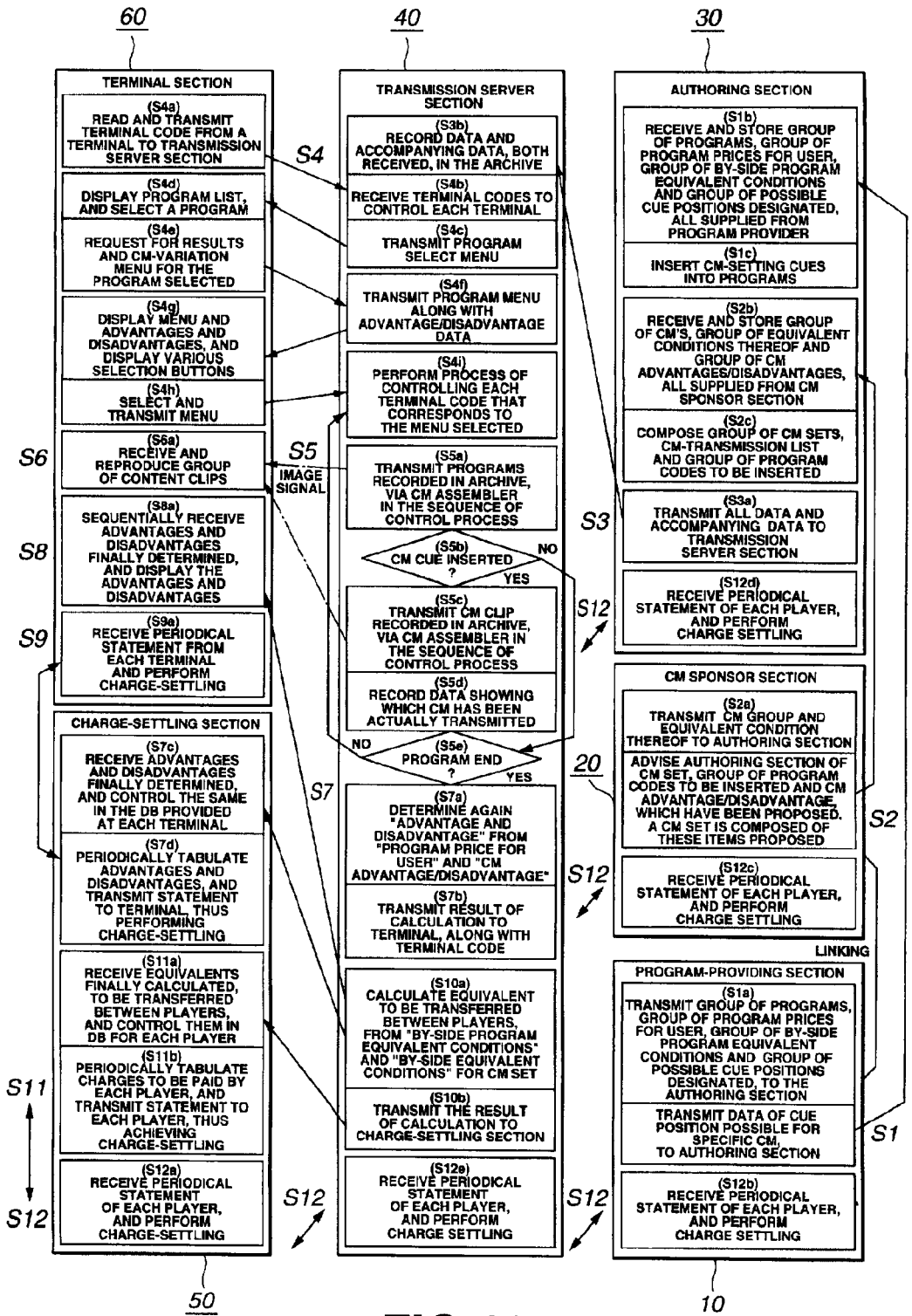
FIG. 12 is a flow chart explaining the operation sequence performed in the data-providing system.

Steps S1 to S12 are performed in the data-providing system 100, as will be explained with reference to the flow chart of FIG. 12.

In the first Step S1, the data-depositing function 10B of the program-providing section 10 transmits programs and accompanying data to the authoring section 30 (Step S1a). The accompanying data includes the program prices for user, the BY-side program equivalent conditions, the possible cue positions designated, and the like. In the authoring section 30, the first registering/storing/transmitting function 30D receives and stores the programs, program prices for user, BY-side program equivalent conditions and possible cue positions designated, all transmitted from the program-providing section 10 (Step S1b). The cue-mark inserting function 30B inserts cue marks into the programs (S1c), each mark being a signal indicating where in a program a CM can be inserted.

In the next Step S2, the data-transmitting function 20B of the CM sponsor section 20 transmits a CM group and the equivalent conditions of the CMs to the authoring section 30 (Step S2a). Further, the data-transmitting function 20B advises the authoring section 30 of the program codes to be inserted and the CM advantages/disadvantages, which have been proposed (Step S2). In the authoring section 30, the second registering/storing/transmitting function 30E receives and stores the CM group, CM equivalent conditions, program codes to be inserted and CM advantages/disadvantages, all supplied from the CM sponsor section 20 (Step S2b). In the authoring section 30, the CM-group designating function 30C composes a group of CM sets, a CM-transmission list, list of CM sets, and a group of program codes to be inserted (Step S2c).

In Step S3, the registering/ storing/transmitting functions 30D, 30E and 30F transmit all data and accompanying data to the transmission server section 40 (Step S3a). In the transmission server section 40, the archive function 40B records the data and the accompanying data (Step S3b).

In Step S4, the terminal-code storing/transmitting function 60B of the terminal section 60 reads a terminal code form a terminal and transmits the same to the transmission server section 40 (Step S4a). In the transmission server section 40, the process-managing function 40C receives the terminal code from the terminal section 60 in order to control each terminal (Step S4b). The menu-transmitting function 40E of the transmission server section 40 transmits a program menu to the terminal section 60 (Step S4c). In the terminal section 60, the program displaying/selecting/transmitting function 60C receives and displays the program menu transmitted from the transmission server section 40 and selects a program (Step S4d). Further, the CM-menu displaying function 60D of the terminal section 60 requests for results and a CM-variation menu for the program selected (S4e). The transmission server section 40 transmits the program menu, along with the advantage/disadvantage data, to the terminal section 60 (S4f). In the terminal section 60, the advantage/disadvantage displaying function 60E displays the advantage/disadvantage data transmitted from the terminal section 60 and various section buttons (Step S4g). The CM-menu selecting/transmitting function 60F of the terminal section 60 selects a CM menu and transmits the same to the transmission server section 40 (Step S4h). The terminal section 60 performs a process of controlling each terminal code that corresponds to the CM menu selected (Step S4i).

In the next Step S5, the archive function 40B of the transmission server section 40 transmits the programs recorded in the archive, one after another, to the terminal section 60 in the control process (Step S5a). Then, it is determined whether a CM cue has been inserted or not (Step S5b). If a CM cue has been inserted, the archive function 40B transmits a CM clip recorded, to the terminal section 60 in the control process (Step S5c). The transmission-record storing function 40J records the data showing which CM has been actually transmitted (Step S5d). It is then determined whether the program has terminated or not (Step S5e). If the program has not terminated yet, the archive function 40B transmits the remaining programs recorded, to the terminal function 60 in the control process (Step S5a).

In Step S6, the reproducing function 60G of the terminal function 60 receives and reproduces the data of each program and the auxiliary data items (Step S6a).

In Step S7, the advantage/disadvantage determining function 40D of the transmission server section 40 determines advantages and disadvantages from the program prices for user and the CM advantage/disadvantage (Step S7a). The result transmitting function 40H transmits the CM advantage/disadvantage finally determined and the terminal code, to the charge-settling section 50 and terminal function 60 (Step S7b). Thus, in the charge-settling section 50, the terminal settlement function 50B and settlement-data management DB function 50D receive the advantages and disadvantages finally determined for the terminal code, and control the same in the settlement-data management DB of the terminal (Step S7c). The terminal-settlement function 50F of the charge-settling section 50 periodically tabulates the advantages and disadvantages for each terminal and transmits a statement to the terminal, thereby settling charges (Step S7d).

In Step S8, the advantage/disadvantage displaying function 60E of the terminal section 60 receives and displays the advantages and disadvantages finally determined and sequentially transmitted from the transmission server section 40 (Step S8a).

In the next Step S9, the charge-settling function 60I of the terminal section 60 receives the periodical statement from the charge-settling section 50 and performs charge-settling (Step S9a).

In Step S10, the charge-calculating function 40I of the transmission server section 40 calculates the equivalents to be transferred between the players, from the BY-side program equivalent conditions and the BY-side equivalent conditions for each CM included in the CM set (Step S10a). The function 40I then transmits the equivalents calculated to the charge-settling section 50 (Step S10b).

In Step S11, the player-charge calculating function 50C of the charge-settling section 50 receives the equivalents supplied from the transmission server section 40, which are to be transferred between the players, controls the equivalents in the DB of each player to manage the equivalents in the settlement-data management DB function 50E (Step S11a). Further, in the charge-settling section 50, the player-charge calculating function 50G periodically tabulates the charges each player must pay and transmits a statement to each player, thus accomplishing charge-settling (Step S 11b).

Further, in Step S12, the charges are settled in the charge-settling section 50 in accordance with the periodical statements of the players (Step S12a). The charge-settling function 10D of the program-providing section 10 settles charges in accordance with the statements for the players, transmitted from the charge-settling section 50 (Step S12b). The charge-settling function 20C of the CM sponsor section 20 settles charges in accordance with the statements for the players, transmitted from the charge-settling section 50 (Step S12c). Next, the charge-settling function 30G of the authoring section 30 settles charges in accordance with the statements for the players, transmitted from the charge-settling section 50 (Step S12d). Then, the charge-settling function 40K of the transmission server section 40 settles charges in accordance with the statement for the players, transmitted from the charge-settling section 50 (Step S12e).

Figure 13:
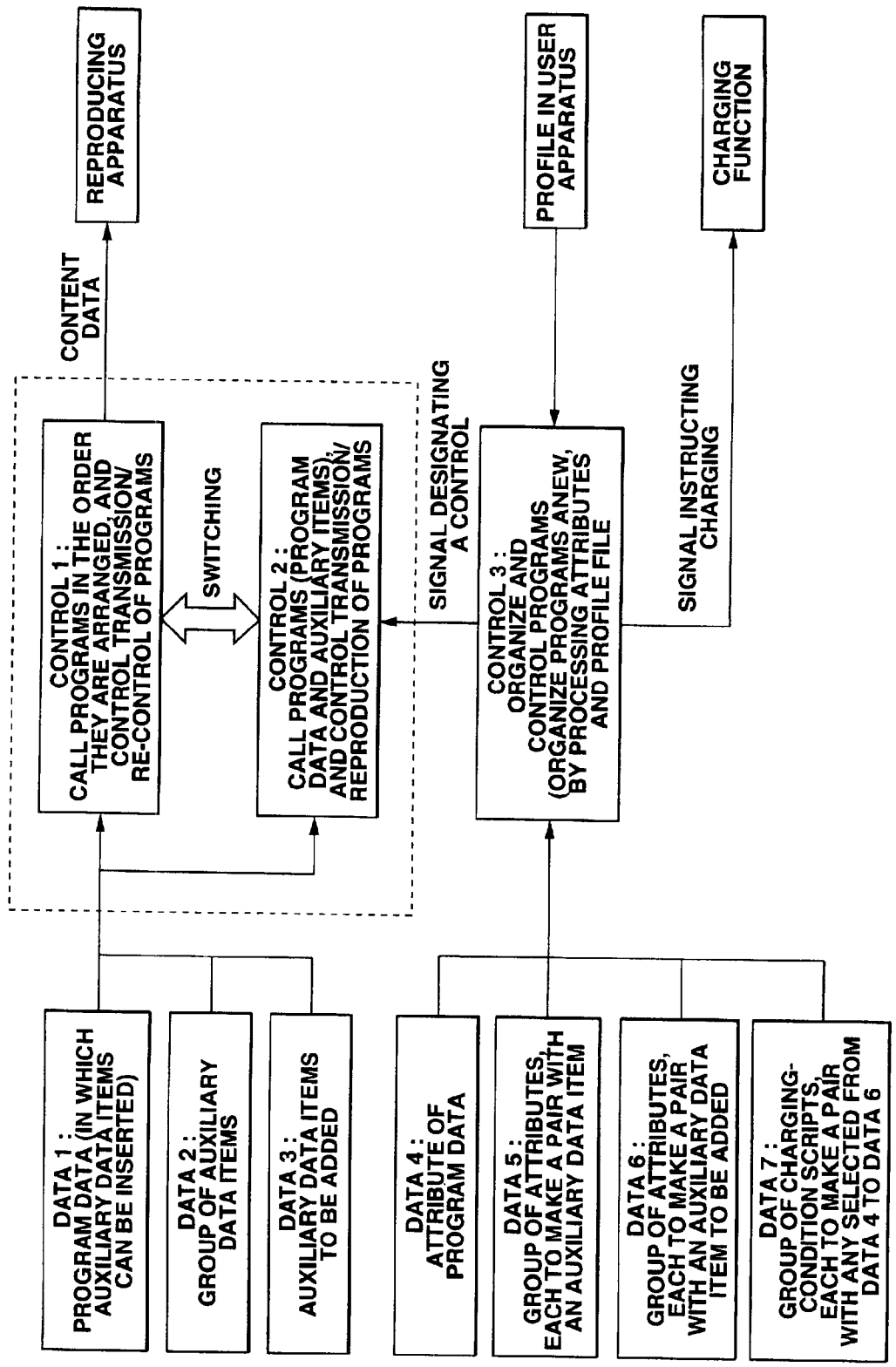
FIG. 13 is a block diagram showing the basic structure of the data-providing system.

FIG. 13 illustrates the basic structure of the data-providing system 100. As shown in FIG. 13, the system 100 comprises three control units 1 to 3. The control unit 1 effects a streaming transmission of data, or content data that is a combination of the multimedia contents (i.e., program data, or data 1) and auxiliary data items (i.e., data 2 and data 3). The control unit 3 automatically organizes a new program by processing the program data items generated by dividing a program, the attributes of auxiliary data items (data 4, data 5, data 6, data 7), and the profile of a user apparatus. The control unit 2 changes the order in which the auxiliary data items to be inserted in the program data will be transmitted.

Data items 1 to 6 may be all transmitted to a terminal (i.e., a data recording/reproducing apparatus), or only "necessary" data items may be transmitted to the terminal. Alternatively, data items 1 to 6 may be processed while being held in a server. Moreover, necessary data (i.e., content clip=program data+auxiliary data items) may be transmitted to a terminal in the form of a package medium, compressed data, a data stream, or a transmission multi-text. In addition, a necessary additional content clip may be transmitted, as data recorded in a package medium, or by means of streaming transmission. The control units 1 to 3 may be implemented in a terminal or a server. Furthermore, the profile of the user apparatus can be located in a terminal or a server, whichever desired.

The data-providing system 100 enables the user to select any one of CM sets available, thereby obtaining a combination of a part of packaged program data and some of auxiliary data items, by virtue of the characteristics of on-demand broadcasting.

For example, timer-calendar data may be applied to the profile of the user apparatus, thereby to replace CMs that no longer need to broadcast, with new ones. The data about the area where the user lives may be applied to the profile, in order to replace the national-version CMs with local-version CMs. Moreover, the data of the user's income may be applied to the profile, thereby broadcast more or less CMs for expensive goods. Further, the timer-calendar data may be applied to the profile, to broadcast programs about cherry-blossom viewing tours at any place where the cherry-blossom front has reached. Alternatively, the areas to which the user plans to take a trip may be applied to the profile, thereby to replace CMs with the CMs for sightseeing in those areas.

In addition, CMs can be selected in accordance with the attributes of the user profile. For example, the type of advertisement and the charge for viewing advertisement can be changed in accordance with the sex and age of the user.

Still further, the annual income of the user may be applied to the profile of the user apparatus. In this case, the guide program for teaching how to prepare annual income report may be revised if the user gets a profit by selling real estate or receives a retirement bonus.

The business title of the user may be applied to the profile, to transmit a program to the user apparatus, which has been so edited in part that the user may understand it better than otherwise.

The information about the stock or bond that the user has bought may be applied to the profile of the user apparatus. If so, the user can receive a stock-market report centering on the very stock he or she has bought.

The information about the user's favorite baseball team may be applied to the profile, so that the user may enjoy a sport program centering on that baseball team.

The children's birthdays may be applied to the profile of the user apparatus, so that an educational program edited may be revised for the children and then broadcast. Further, the user's tastes for music may be applied to the profile, thereby to transmit a BGM program full of the user's favorite music to the user apparatus.

Moreover, the operating schedule of the airline the user often uses may be automatically analyzed and the results of analysis may be applied to the profile of the user apparatus. In this case, the user can enjoy a program in which the flight timetable of that airline is scroll-displayed.

With the data-providing system 100 it is possible to automatically update and analyze the profile of the user, whereby programs can be revised for the user.

What is claimed is:

1. A data-providing system comprising:

a transmission server section for performing streaming transmission of on-demand programs; and a terminal section for performing streaming reception of the on-demand programs transmitted from the transmission server section, wherein the terminal section has a function of selecting a set of auxiliary data items to be inserted into a program, from sets of auxiliary data items, and a function of transmitting a signal representing the selected set of auxiliary data items, along with a terminal code of the terminal section; and the transmission server section has a function of receiving the signal transmitted from the terminal section and representing the selected set off auxiliary data items, assembling the auxiliary data items in real time, and transmitting the same in accordance with a transmission list of auxiliary data items that correspond to the set of auxciliary data items inserted in a series of programs to be transmitted to the terminal section.

2. The data-providing system according to claim 1, further comprising a charge-settling section having a function of periodically tabulating charge-settling data stored in a data base for each user and controlled in the terminal section and transmitting a statement to the user, thereby to achieve charge-settling, and a function of periodically tabulating equivalents calculated to be paid among suppliers and transmitting a statement to each player, thereby to accomplish charge-settling.

3. The data-providing system according to claim 1, wherein the terminal section has a function of requesting the transmission server section for the advantages and disadvantages of a set of auxiliary data items that can be selected, after selecting a program that may be supplied to a user, and informing the user of the advantages and disadvantages of the set of auxiliary data items that can be selected; and the transmission server section has a function of determimng, in response to a request made by the terminal section, advantages and disadvantages from the user price of a program and the advantages and disadvantages of the auxiliary data items inserted in the program and transmitting the advantages and disadvantages thus determined, said advantages and disadvantages determined being those the user may have when the program is transmitted together with the auxiliary data items selected.

4. The data-providing system according to claim 2, wherein the transmission server section has a function of transmitting the charge-settling data finally obtained about the program selected by a customer who uses the terminal section, to the charge-settling section and the terminal section; and the charge-settling section applies the charge-settling data transmitted from the transmission server section, to the charge-settling data base provided for the terminal section, thereby to manage the charge-settling data.

5. The data-providing system according to claim 2, wherein the transmission server section has a function of applying data representing payment made among suppliers to the data base provided for each player, thereby to manage the payment, when a program is transmitted, together with selected auxiliary data items, in accordance with the supplier-side equivalent conditions of the program and the supplier-side equivalent conditions of auxiliary data items inserted in the program.

6. A data-providing system comprising:

an authoring section having a function of registering, storing and transmitting program prices for user, a function of registering, storing and transmitting supplier-side equivalent conditions, a function of designating positions at which to insert auxiliary data items into a program, a function of designating auxiliary data items to be inserted into a program from auxiliary data libraries, and a function of determining an order in which to transmit the auxiliary data items prepared for a program and holding the qrder determined, in the form of an auxiliary data transmission list;

a transmission server section for transmitting a continuous stream of content data that consists of multimedia content groups, each being an asspmbly prepared and composed of program data and auxiliary data items; and a terminal section for performing streaming reception of the on-demand programs transmitted from the transmission server section, wherein the terminal section has a function of selecting a set of auxciliary data items to be inserted into a program, from sets of auxiliary data items, and a functiqn of transmitting a signal representing the selected set of auxiliary data items, along with a terminal code of the terminal section; and the transmission server section has a function of receiving the signal transmitted from the terminal section and representing the selected set of auxiliary data items, assembling the auxiliary data items in real time, and transmitting the same in accordance with a transmission list of auxiliary data items that correspond to the set of auxiliary data items inserted in a series of programs to be transmitted to the terminal section.

7. The data-providing system according to claim 6, wherein the authoring section designates groups of auxiliary data items to be inserted into a program, from the plurality of auxiliary data libraries.

8. The data-providing system according to claim 6, wherein the authoring section determines an order in which to transmit the auxiliary data items prepared for a program and holding the order determined, in the form of an auxiliary data transmission list.

9. The data-providing system according to claim 6, wherein the authoring section further has a function of registering, storing and transmitting advantages and disadvantages a user has when a series of auxiliary data items designated in at least one auxiliary data transmission list are transmitted.

10. The data-providing system according to claim 6, wherein the authoring section further has a function of registering, storing and transmitting the equivalents to be paid among suppliers when the auxiliary data items in the auxiliary data transmission list are transmitted and the auxiliary data equivalent conditions that are an order to moving data.

11. A data-providing method comprising the steps of:

selecting a set of auxiliary data items to be inserted into a program, from sets of auxiliary data items, at a terminal that receives a stream of on-demand programs from a transmission server;

transmitting from the terminal a signal representing the selected set of auxiliary data items, along with a terminal code of the terminal section;

receiving, at the transmission server, the signal transmitted from the terminal and representing the selected set of auxiliary data items;

assembling, in the transmission server, the auxiliary data items in real time in accordance with a transmission list of auxiliary data items that correspond to the set of auxiliary data items inserted in a series of programs to be transmitted to the terminal; and transmitting the auxiliary data items from the transmission server to said terminal.

* * * * *

UNITED STATES PATENT AND TRADEMARK OFFICE
CERTIFICATE OF CORRECTION

PATENT NO. : 6,944,879 B2
DATED : September 13, 2005
INVENTOR(S) : Tomoshi Hirayama It is certified that error appears in the above-identified patent and that said Letters Patent is hereby corrected as shown below:

Column 3,
Line 30, change "sever" to -- server --.

Column 4,
Line 17, change "sever" to -- server --.

Column 8,
Line 11, delete "in the".

Column 9,
Line 37, delete "no".

Column 17,
Line 34, change "auxciliary" to -- auxiliary --.
Line 36, change "functiqn" to -- function --.

Signed and Sealed this

Twenty-fifth Day of April, 2006

JON W. DUDAS
*Director of the United States Patent and Trademark Office*